Figure 1:
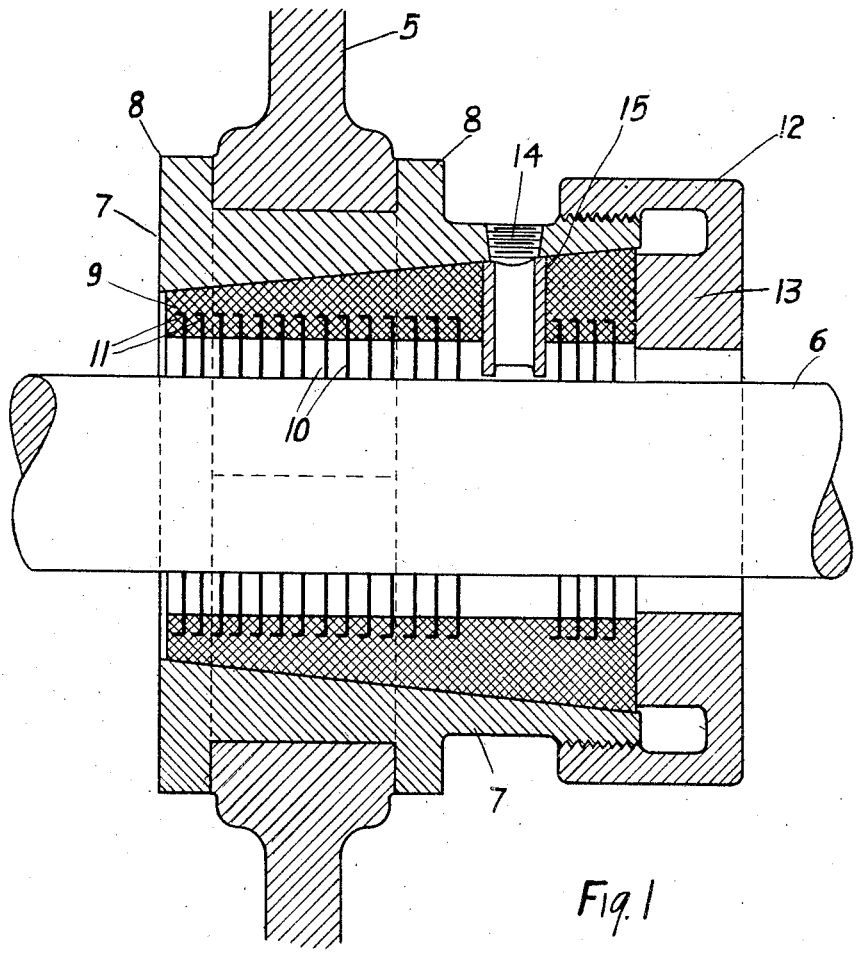

March 10, 1925.

H. F. SCHMIDT 1,528,895

PACKING

Filed Aug. 8, 1919

WITNESSES

INVENTOR.
Henry F. Schmidt
BY
ATTORNEY

Patented Mar. 10, 1925.

1,528,895

UNITED STATES PATENT OFFICE.

HENRY F. SCHMIDT, OF PITTSBURGH, PENNSYLVANIA, ASSIGNOR TO WESTINGHOUSE ELECTRIC & MANUFACTURING CO., A CORPORATION OF PENNSYLVANIA.

PACKING.

Application filed August 8, 1919. Serial No. 316,245.

*To all whom it may concern:*

Be it known that I, HENRY F. SCHMIDT, a citizen of the United States, and a resident of Pittsburgh, in the county of Allegheny and State of Pennsylvania, have made a new and useful Invention in Packing, of which the following is a specification.

This invention relates to packings such, for example, as packings for sealing the joint between a rotatable shaft and a casing with which the shaft has relative motion.

Steam turbines are usually provided with some form of packing for sealing the joint between the rotor or spindle shaft and the casing which encloses the rotor or spindle. The packing is provided for the purpose of excluding air from the casing if the turbine is operating under vacuum, or for preventing the leakage of steam from the casing along the shaft if the turbine is operating non-condensing or with a back pressure greater than atmospheric pressure.

One well known form of packing consists of a number of thin annular rings which are directly or indirectly mounted on the casing and which extend toward and practically touch the shaft. In some cases rings are also mounted on the shaft alternating with those mounted on the casing and are adapted to practically touch the casing. The pressure of the steam or air is so reduced after working its way through some of the cracks between the rings and the cooperating casing or shaft that leakage is eliminated or reduced to a negligible amount. Packings of this type may be termed labyrinth packings.

An object of my invention is to produce a new and improved labyrinth packing which may be adjusted to compensate for wear and which is simpler in construction than other labyrinth packings now in use and known to me.

A further object is to produce a new and improved labyrinth packing which is cheaper and easier to construct than other packings now in use and known to me.

These and other objects which will be made apparent throughout the further description of my invention are attained by means of apparatus embodying the features herein described and illustrated in the drawings accompanying and forming a part hereof.

In the drawings: Fig. 1 is a diagrammatic sectional view of packing embodying my invention.

Figure 2:
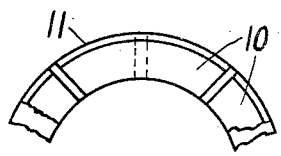

Fig. 2 is a diagrammatic view of packing rings such as may be employed in connection with the apparatus illustrated in Fig. 1.

In the drawings I have illustrated a packing for sealing a joint between a casing 5 and a rotatable shaft 6. As shown, the packing is enclosed within an auxiliary casing 7, which is secured to or mounted on the casing 5 and which surrounds the shaft 6. In the construction illustrated the auxiliary casing 7 is secured to the casing 5 by means of annular shoulders 8 which bear against opposite sides of the casing 5. It will, of course, be understood that the casing 5 is preferably made in two sections and hence the auxiliary casing 7 may be removed when the casing 5 is opened. The auxiliary casing 7 may also be made in two or more sections, if desired, so that it may be removed from the shaft 6 without the necessity of sliding it over the end of the shaft.

As illustrated, the auxiliary casing 7 is in the form of a ring surrounding the shaft 6 and having a tapered or conical bore. An inner ring 9 having a cylindrical bore and a conical or tapered outer periphery is adapted to fit the bore of the auxiliary casing 7 and to also enclose the shaft 6. As shown, a plurality of packing rings 10 are mounted on the inner periphery of the ring 9 and are adapted to extend across the space between the ring and the shaft 6. These packing rings touch, or nearly touch, the shaft 6 and thereby form a labyrinth packing between the shaft and the casing. The packing rings 10 may be made in one piece or in segments which overlap each other, as shown in Fig. 2, and are preferably so thin that they wear easily and therefore adjust themselves to the shaft 6 without excessive heating. The inner ring 9 may be said to constitute a ring-carrying adjuster member, and is preferably made of relatively soft or compressible metal, such as Babbitt metal, in which the packing rings 10 are cast in place. I have shown a small flange 11 on the outer periphery of each packing ring 10 for the purpose of securely anchoring the packing rings in place in the soft metal ring 9. However, it will be apparent that the packing rings 10 may be secured to the inner ring 9 in any suitable manner.

I have shown a nut 12 on the outer end of the casing 7 for forcing the soft metal ring into the conical bore of the auxiliary casing 7. As illustrated, the nut 12 is threaded on the auxiliary casing and is provided with a reentrant flange 13, which is adapted to bear against the large end of the soft metal ring 9.

If the bearings supporting the shaft 6 become worn so as to drop the shaft a slight amount, the packing rings 10 will be worn away on the lower side of the shaft and of course, the shaft will drop away from the rings on the upper side and permit excessive leakage. Under such conditions the nut 12 is screwed up so as to force the soft metal ring 9 farther into the conical bore of the auxiliary casing 7. The construction of the ring 9 and the auxiliary casing 7 is such that maximum radial movements of the packing rings 10 is obtained for a definite longitudinal movement of the nut 12. The compression of the ring 9 causes the packing rings 10 to close in around the shaft 6 and to reestablish the proper relation between the shaft and the packing rings. Although this adjustment may initially cause excessive pressure between the rings 10 and the shaft, the rings will quickly wear off to a perfect fit without danger of excessive overheating, and in this manner the packing may be readjusted either in case of wear in the bearings or in case of a misalignment of the bearings or casing.

In the gland illustrated, I have shown an arrangement of packing rings 10 which ensures the exclusion of air from the interior of the casing 5 when the pressure within the casing is less than atmospheric pressure. As shown, a passage 14 communicates with the space between the soft metal ring 9 and the shaft 6 at a point intermediate the series of packing rings 10. This passage is preferably formed by means of a noncollapsible member such as a section of brass tubing 15, which is preferably embedded in the metal of the ring 9. Steam at about atmospheric pressure may be delivered to this passage and consequently there being substantially no difference between the pressure existing outside and inside the group of packing rings, no air will flow into the packing. A certain amount of steam may leak through the packing to the interior of the casing 8, due to the low pressure existing in the latter, but a small amount of steam leakage is not objectionable, especially as compared with a similar leakage of air. When the pressure in the casing 5 is greater than atmospheric pressure, leakage fluid may be carried off through the passage 14.

The packing illustrated is simple in construction and may be easily and cheaply manufactured. For example, the packing rings 10 may be punched out of sheet metal and then cast in place in the soft metal ring 9. By means of this construction machining is reduced to a minimum. The packing may be easily adjusted to compensate for wear or misalignment and is so constructed that the danger of excessive heating, due to the packing ring rubbing against the shaft is eliminated. If desired, packing rings may also be mounted on the shaft 6 so as to alternate with those mounted in the soft metal ring 9.

While I have described and illustrated but one embodiment of my invention, it will be apparent to those skilled in the art that various changes, modifications, additions and omissions may be made in the apparatus described and illustrated without departing from the spirit and scope of the invention as set forth by the appended claims.

What I claim is:

1. In a packing, relatively rotatable members, packing rings, a compressible support for said rings mounted on one of the members, said compressible support having a cylindrical bore and a frustro-conical outer surface, and means for compressing said support to cause the rings to move radially toward the other member.

2. In a packing for relatively rotatable members, a plurality of segmental rings for sealing the joint between said members, a compressible support for said rings, a tapered seat for said support on one of the members, and means for moving the support on the tapered seat to cause the rings to approach the other member.

3. In a packing, a stationary element, a rotatable element extending through the stationary element, a plurality of thin annular segmental rings mounted on said stationary element and projecting inward toward the rotatable element, a compressible support for said rings, a conical seat for said support in the stationary element, and means for forcing said compressible support into the conical seat to cause the rings to move toward and close in on the rotatable element.

4. In a packing, a casing having a tapered bore, a rotatable shaft extending through the casing axially thereof, a plurality of spaced rings surrounding the shaft with a slight clearance, an annular support in which the rings are embedded, said support having an outer frustro-conical surface coincident with the tapered bore of the casing, and means for moving the support axially to bring the rings into clearances with the shaft.

5. In a packing, a casing having a tapered bore, a rotatable shaft extending through the casing axially thereof, a plurality of spaced segmental rings surrounding the shaft with a slight clearance, an annular support in which the rings are embedded, said support having an outer frustro-conical surface coincident with the tapered bore of the casing, and means for moving the support axially to bring the rings into closer clearances with the shaft.

6. In a packing, a casing having a tapered bore, a rotatable shaft extending through the casing axially thereof, a plurality of spaced rings surrounding the shaft with a slight clearance, an annular support of soft metal in which the rings are embedded, said support having an outer frustro-conical surface coincident with the tapered bore of the casing, and means for moving the support axially to bring the rings into closer clearances with the shaft.

7. In a packing, a casing having a tapered bore, a rotatable shaft extending through the casing axially thereof, a plurality of spaced segmental rings surrounding the shaft with a slight clearance, an annular support of soft metal in which the rings are embedded, said support having an outer frustro-conical surface coincident with the tapered bore of the casing, and means for moving the support axially to bring the rings into closer clearances with the shaft.

In testimony whereof, I have hereunto subscribed my name this 30th day of July, 1919.

HENRY F. SCHMIDT.